(12) United States Patent
Kannan

(10) Patent No.: US 10,592,949 B2
(45) Date of Patent: Mar. 17, 2020

(54) METHOD AND APPARATUS FOR LINKING CUSTOMER INTERACTIONS WITH CUSTOMER MESSAGING PLATFORMS

(71) Applicant: [24]7.ai, Inc., San Jose, CA (US)

(72) Inventor: Pallipuram V. Kannan, Saratoga, CA (US)

(73) Assignee: [24]7.ai, Inc., San Jose, CA (US)

( * ) Notice: Subject to any disclaimer, the term of this patent is extended or adjusted under 35 U.S.C. 154(b) by 343 days.

(21) Appl. No.: 15/348,939

(22) Filed: Nov. 10, 2016

(65) Prior Publication Data

US 2017/0140449 A1 May 18, 2017

Related U.S. Application Data

(60) Provisional application No. 62/255,243, filed on Nov. 13, 2015.

(51) Int. Cl.
*G06Q 30/00* (2012.01)
*G06Q 30/06* (2012.01)
*H04L 29/06* (2006.01)
*G06Q 30/02* (2012.01)

(52) U.S. Cl.
CPC ....... *G06Q 30/0613* (2013.01); *G06Q 30/016* (2013.01); *G06Q 30/0281* (2013.01); *H04L 63/0815* (2013.01); *H04L 63/0853* (2013.01)

(58) Field of Classification Search
CPC .............. G06Q 30/0613; G06Q 30/016; G06Q 30/0281; H04L 63/0815; H04L 63/0853; H04L 67/02
See application file for complete search history.

(56) References Cited

U.S. PATENT DOCUMENTS

2006/0059107 A1 3/2006 Elmore et al.
2011/0265172 A1 10/2011 Sharma et al.
(Continued)

OTHER PUBLICATIONS

Gafni, Ruti, and Dudu Nissim. "To social login or not login? Exploring factors affecting the decision." Issues in Informing Science and Information Technology 11.1 (2014): 057-072. (Year: 2014).*

(Continued)

*Primary Examiner* — Matthew E Zimmerman
(74) *Attorney, Agent, or Firm* — Perkins Coie LLP; Michael A. Glenn

(57) ABSTRACT

A computer-implemented method and an apparatus link customer interactions with customer messaging platforms. An input indicating a request for interaction with an enterprise is received from a customer and in response to the received input, a user interface (UI) is displayed requesting the customer to authenticate a personal identity using login credentials corresponding to at least one third-party messaging platform. A customer interaction is facilitated with the enterprise subsequent to successful authentication of the personal identity. The customer interaction is facilitated on an enterprise interaction channel or a third-party messaging platform from among the at least one third-party messaging platform. The third-party messaging platform corresponds to the login credentials provided by the customer to authenticate the customer's personal identity.

21 Claims, 6 Drawing Sheets

(56) References Cited

U.S. PATENT DOCUMENTS

| | | | | |
|---|---|---|---|---|
| 2013/0185196 A1* | 7/2013 | Kadur | ................... | G06Q 20/22 |
| | | | | 705/39 |
| 2013/0262168 A1* | 10/2013 | Makanawala | ........... | H04L 51/32 |
| | | | | 705/7.14 |
| 2014/0043426 A1* | 2/2014 | Bicanic | ............ | H04N 21/41407 |
| | | | | 348/14.02 |
| 2014/0237061 A1* | 8/2014 | Logan | ..................... | H04L 67/02 |
| | | | | 709/206 |
| 2015/0046253 A1 | 2/2015 | Finkelstein | | |

OTHER PUBLICATIONS

Wang, et al., "Signing Me onto Your Accounts through Facebook and Google: A Traffic-Guided Security Study of Commercially Deployed Single-Sign-On Web Services", 2012 IEEE Symposium on Security and Privacy, May 1, 2012 (May 1, 2012), XP055056725, DOI: 10.1109/SP.2012.30 ISBN: 978-0-76-954681-0 * the whole document*, 2012, pp. 365-379.

* cited by examiner

METHOD AND APPARATUS FOR LINKING CUSTOMER INTERACTIONS WITH CUSTOMER MESSAGING PLATFORMS

CROSS REFERENCE TO RELATED APPLICATIONS

This application claims priority to U.S. provisional patent application Ser. No. 62/255,243, filed Nov. 13, 2015, which is incorporated herein in its entirety by this reference thereto.

TECHNICAL FIELD

The present invention generally relates to interactions between customers and enterprises, and more particularly to a method and apparatus for linking customer's enterprise related interactions with customer messaging platforms for improving customer interaction experiences.

BACKGROUND

Existing and potential customers of enterprises routinely engage in interactions with the enterprises to enquire about products/services of interest, to resolve concerns, to make payments, to lodge complaints, etc. The interactions may be conducted over one or more interaction channels, such as a Web channel, a voice channel, a chat channel, an interactive voice response (IVR) channel, a social media channel, a native mobile application channel, and the like.

Typically, a customer may interact with several enterprises for a variety of purposes. For example, a customer may visit a Website of a banking enterprise and chat with a customer support representative to resolve a home loan related query.

In another illustrative example, the customer may instruct a virtual assistant on a mobile phone to open a native mobile application of an airline enterprise to cancel a prior reservation.

Generally, the customers are required to setup a personal account and authenticate their respective identity prior to engaging in interactions, such as a chat interaction with a customer support representative of an enterprise.

Setting up of an account or authenticating the customer identity enables the customer support representative, i.e. an agent, to assist the customer in a more efficient manner. For example, upon identifying the customer, the agent may pull-up relevant data, such as data related to past transactions, recent interactions, etc., and predict customer's intention for requesting an interaction with the enterprise. The agent may further provide suitable recommendations to the customer based on the predicted intention of the customer.

Such support, although useful, is cumbersome for the customer because the customer must remember login credentials for each enterprise with which the customer engages in an interaction. Moreover, the interfaces and options for interacting with the enterprises may differ from one enterprise to another.

SUMMARY

In an embodiment of the invention, a computer-implemented method for linking customer interactions with customer messaging platforms is disclosed. The method receives, by a processor, an input indicating a request for interaction with an enterprise. The input is provided by a customer of the enterprise using an electronic device. In response to the received input, the method causes, by the processor, display of a user interface (UI) on the electronic device. The UI is configured to request the customer to authenticate a personal identity using login credentials corresponding to at least one third-party messaging platform. The method facilitates, by the processor, a customer interaction with the enterprise subsequent to successful authentication of the personal identity. The customer interaction is facilitated on one of an enterprise interaction channel and a third-party messaging platform from among the at least one third-party messaging platform. The third-party messaging platform corresponds to the login credentials provided by the customer for authenticating the personal identity.

In another embodiment of the invention, an apparatus for linking customer interactions with customer messaging platforms includes at least one processor and a memory. The memory stores machine executable instructions therein that, when executed by the at least one processor, cause the apparatus to receive an input indicating a request for interaction with an enterprise. The input is provided by a customer of the enterprise using an electronic device. In response to the received input, the apparatus is caused to display of a user interface (UI) on the electronic device. The UI is configured to request the customer to authenticate a personal identity using login credentials corresponding to at least one third-party messaging platform. The apparatus is caused to facilitate a customer interaction with the enterprise subsequent to successful authentication of the personal identity. The customer interaction is facilitated on one of an enterprise interaction channel and a third-party messaging platform from among the at least one third-party messaging platform. The third-party messaging platform corresponds to the login credentials provided by the customer to authenticate the customer's personal identity.

In another embodiment of the invention, a computer-implemented method for linking customer interactions with customer messaging platforms is disclosed. The method receives, by a processor, an input indicating a request for chat interaction with an agent of an enterprise. The input is provided by a customer of an enterprise using an electronic device. In response to the received input, the method causes, by the processor, display of a user interface (UI) on the electronic device. The UI is configured to request the customer to authenticate a personal identity using login credentials that correspond to at least one third-party messaging platform. The method facilitates, by the processor, the chat interaction with the agent of the enterprise subsequent to successful authentication of the personal identity. The chat interaction is facilitated on one of an enterprise Website and a third-party messaging platform from among the at least one third-party messaging platform. The third-party messaging platform corresponds to the login credentials provided by the customer for authenticating the customer's personal identity.

DETAILED DESCRIPTION

The detailed description provided below in connection with the appended drawings is intended as a description of the present embodiments of the invention and is not intended to represent the only forms in which the present invention may be constructed or used. However, the same or equivalent functions and sequences may be accomplished by different examples.

Enterprises and their customers interact with each other for a variety of purposes. Generally, the customers are required to setup a personal account and authenticate their respective identity prior to engaging in interactions, such as a chat interaction with a customer support representative of an enterprise. Setting up of an account or authenticating the customer identity enables the customer support representative, i.e. an agent, to assist the customer in a more efficient manner. Such support, although useful, is cumbersome for the customer because the customer must remember login credentials for each enterprise with which the customer engages in an interaction. Moreover, the interfaces and options for interacting with the enterprises may differ from one enterprise to another.

Various embodiments of the invention provide a method and apparatus that are capable of overcoming these and other obstacles and providing additional benefits. More specifically, various embodiments of the invention disclosed herein facilitate customer interactions with enterprises efficiently, without having the customer to remember login credentials and/or authentication information for every enterprise with which the customer interacts, while providing the customer with a personalized customer service experience as they would have received had they setup a personal account. Further, the method and apparatus disclosed herein enable a customer to interact with an enterprise using a medium that the customer is already accustomed to, without having to waste time and effort in navigating through myriad options presented by the enterprise for facilitating interactions. An example apparatus for linking customer interactions to third-party messaging platforms is explained with reference to FIG. 1.

Figure 1:
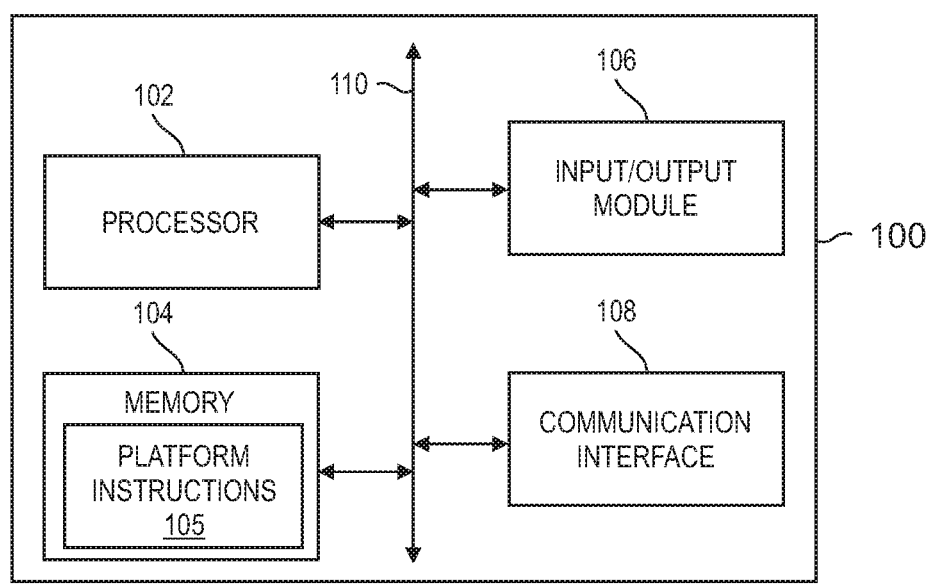
FIG. 1 is a block diagram of an apparatus configured to link customer interactions with third-party messaging platforms in accordance with an embodiment of the invention.

FIG. 1 is a block diagram of an apparatus 100 configured to link customer interactions with third-party messaging platforms in accordance with an embodiment of the invention. The term 'customer' as used herein refers to either an existing user or a potential user of enterprise offerings such as products, services, and/or information. Moreover, the term 'customer' of the enterprise may refer to an individual, a group of individuals, an organizational entity, etc. The term 'interaction' or 'customer interaction' as used interchangeably herein refers to any communication and/or exchange between a customer and an enterprise related entity, such as for example a customer support representative or an agent of the enterprise, and the like. Some non-exhaustive examples of the agents of the enterprise include human agents, virtual agents such as, for example, automated bots such as chatbots or IVR systems, enterprise virtual assistants, and the like. In an illustrative example, a customer activity of engaging in a voice call interaction or a chat interaction with a human agent or a virtual agent associated with the enterprise may be considered as an interaction between the customer and the enterprise. In yet another illustrative example, the activity of using enterprise self-help tools, such as for example an interactive voice response (IVR) system, by the customer may also be considered as an interaction between the customer and the enterprise. Accordingly, any such form of communication or exchange between a customer and an enterprise related entity is referred to herein as the customer interaction.

The term 'enterprise' as used herein may refer to a corporation, an institution, a small/medium sized company, or even a brick and mortar entity. In an illustrative example, an enterprise may be a banking enterprise offering financial products, such as savings, investments, and loan accounts; credit, debit, and corporate cards; and the like, to its customers. In another illustrative example, the enterprise may be a media enterprise offering daily local and international news to its customers. In yet another illustrative example, an enterprise may be device manufacturer offering the latest electronic gadgets of personal use to its customers.

Further, the term 'linking of customer interactions with third-party messaging platforms' as used herein comprehends enabling customer interactions with enterprises using commonly used messaging platforms. The commonly used messaging platforms are used to effect customer authentication. The third-party messaging platforms are also interchangeably referred to herein as 'customer messaging platforms' or 'messaging platforms'. In some embodiments, the linking of customer interactions to messaging platforms involves enabling interactions between the customers and the agents on the messaging platforms.

The apparatus 100 includes at least one processor, such as a processor 102 and a memory 104. Although the apparatus 100 is depicted to include only one processor, the apparatus 100 may include any number of processors therein. In an embodiment, the memory 104 is capable of storing machine executable instructions, referred to herein as platform instructions 105. Further, the processor 102 is capable of executing the platform instructions 105. In an embodiment, the processor 102 may be embodied as a multi-core processor, a single core processor, or a combination of one or more multi-core processors and one or more single core processors. For example, the processor 102 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 102 may be configured to execute hard-coded functionality. In an embodiment, the processor 102 is embodied as an executor of software instructions, wherein the instructions may specifically configure the processor 102 to perform the algorithms and/or operations described herein when the instructions are executed.

The memory 104 may be embodied as one or more volatile memory devices, one or more non-volatile memory devices, and/or a combination of one or more volatile memory devices and non-volatile memory devices. For example, the memory 104 may be embodied as magnetic storage devices, such as hard disk drives, floppy disks, magnetic tapes, etc.; optical magnetic storage devices, e.g. magneto-optical disks, CD-ROM (compact disc read only memory), CD-R (compact disc recordable), CD-R/W (compact disc rewritable), DVD (Digital Versatile Disc), BD (BLU-RAY® Disc); and semiconductor memories, such as mask ROM, PROM (programmable ROM), EPROM (erasable PROM), flash memory, RAM (random access memory); etc.

The apparatus 100 also includes an input/output module 106 (hereinafter referred to as 'I/O module 106') and at least one communication interface, such as the communication interface 108. In an embodiment, the I/O module 106 may include mechanisms configured to receive inputs from and provide outputs to a user of the apparatus 100. To that effect, the I/O module 106 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 102 may include I/O circuitry configured to control at least some functions of one or more elements of the I/O module 106, such as for example, a speaker, a microphone, a display, and/or the like. The processor 102 and/or the I/O circuitry may be configured to control one or more functions of the one or more elements of the I/O module 106 through computer program instructions, for example, software and/or firmware, stored on a memory, for example, the memory 104, and/or the like, accessible to the processor 102.

The communication interface 108 includes several channel interfaces to communicate with remote entities related to various enterprise interaction channels. For example, the communication interface 108 may include a Web channel interface to communicate with a Web server hosting one or more Web pages related to an enterprise Website. In an illustrative example, Website content such as individual Web pages, hyperlinks, images, menu options, and the like, may be associated with Hyper Text Markup Language (HTML) tags or JavaScript tags. These tags are configured to record customer activity, such as click inputs or mouse rollover events. The Web server may communicate such recorded customer activity information in substantially real-time to the communication interface 108. In response to the received activity information, the communication interface 108 may provide instructions from the processor 102 to the Web server, such as for example, instructions to cause display of a chat widget or a pop-up advertisement during the ongoing Web journey of the customer on the enterprise Website. The communication interface 108 may similarly include channel interfaces to communicate with several remote entities related to a plurality of enterprise interaction channels. For example, the communication interface 108 may be in operative communication with a data-logging server at a customer support/service center configured to maintain real-time information related to voice and/or chat interactions between customers and agents.

Each channel interface may be associated with a respective communication circuitry such as, for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities.

In at least one example embodiment, the channel interfaces are configured to receive up-to-date information related to the customer-enterprise interactions from the enterprise interaction channels. Some non-limiting examples of the enterprise interaction channels may include a Web channel, i.e. an enterprise Website; a voice channel, i.e. voice-based customer support; a chat channel, i.e. a chat support; a native mobile application channel; a social media channel; and the like. In some embodiments, the information may also be collated from the plurality of devices utilized by the customers. To that effect, the communication interface 108 may be in operative communication with various customer touch points, such as electronic devices associated with the customers, Websites visited by the customers, devices used by customer support representatives (for example, voice agents, chat agents, IVR systems, in-store agents, and the like) engaged by the customers, and the like.

In at least some embodiments, the communication interface 108 may include relevant application programming interfaces (APIs) to communicate with applications, such as native mobile applications in the customer's devices. For example, the communication interface 108 may be configured to receive data signals from virtual assistants (VAs) such as, for example, operating system related virtual assistants such as 'Siri®' from Apple Inc.®, 'Google Now™' from Google®, or 'Cortana®' from Microsoft Corporation®, and the like, installed in the customer's electronic devices. The communication interface 108 may also include relevant hardware and software stacks to communicate with various common messaging platform servers. In an illustrative example, communication interface 108 may be configured to be in communication with servers of common messaging platforms, such as Facebook®, Google Circles™, LinkedIn®, or chat platforms such as Yahoo! Messenger™, Gtalk™, WhatsApp™, and the like. Furthermore, the communication interface 108 may include login related APIs of such common messaging platforms, such that the login credentials provided by the customers for authenticating their personal identity for the messaging platforms may be directed to the relevant authentication servers associated with the respective common messaging platforms and an 'authenticated' or 'authentication not successful' message received from the servers. The communication between the communication interface 108 and the servers related to common messaging platforms may be realized over various types of wired or wireless networks. Some examples of the wired networks may include Ethernet, local area network (LAN), fiber-optic cable network, and the like. Some examples of the wireless networks may include cellular networks like GSM/3G/4G/CDMA networks, wireless LANs, blue-tooth or Zigbee networks, and the like. An example of a combination of wired and wireless networks may include the Internet.

In an embodiment, various components of the apparatus 100, such as the processor 102, the memory 104, the I/O module 106, and the communication interface 108 are configured to communicate with each other via or through a centralized circuit system 110. The centralized circuit system 110 may be various devices configured to, among other things, provide or enable communication between the components (102-108) of the apparatus 100. In certain embodiments, the centralized circuit system 110 may be a central printed circuit board (PCB) such as a motherboard, a main board, a system board, or a logic board. The centralized circuit system 110 may also, or alternatively, include other printed circuit assemblies (PCAs) or communication channel media.

The apparatus 100 as illustrated and hereinafter described is merely illustrative of an apparatus that could benefit from embodiments of the invention and, therefore, should not be taken to limit the scope of the invention. The apparatus 100 may include fewer or more components than those depicted in FIG. 1. In an embodiment, the apparatus 100 may be implemented as a platform including a mix of existing open systems, proprietary systems, and third party systems. In another embodiment, the apparatus 100 may be implemented completely as a platform including a set of software layers on top of existing hardware systems. In an embodiment, one or more components of the apparatus 100 may be deployed in a Web Server. In another embodiment, the apparatus 100 may be a standalone component in a remote machine connected to a communication network and capable of executing a set of instructions (sequential and/or otherwise) to link customer interactions with customer messaging platforms. Moreover, the apparatus 100 may be implemented as a centralized system, or, alternatively, the various components of the apparatus 100 may be deployed in a distributed manner while being operatively coupled to each other. In an embodiment, one or more functionalities of the apparatus 100 may also be embodied as a client within devices, such as customers' devices. In another embodiment, the apparatus 100 may be a central system that is shared by or accessible to each of such devices.

The linking of customer interactions with customer messaging platforms by the apparatus 100 is hereinafter explained with reference to one customer interaction. It is noted the apparatus 100 may be caused to link customer interactions of several customers with customer messaging platforms in a similar manner.

In at least one example embodiment, the processor 102 is configured to, with the content of the memory 104, cause the apparatus 100 to receive an input indicating a request for interaction with an enterprise. The input may be provided by a customer of the enterprise using an electronic device. In an illustrative example scenario, a customer of an enterprise may wish to interact with an enterprise to enquire about a product/service of interest, to resolve a concern, to make a payment, or to lodge a complaint. Accordingly, the customer may access an enterprise Website on an electronic device, such as a desktop computer, a laptop, a Smartphone, or a tablet computer. Further, the customer may click on a chat widget displayed in a right-hand corner section of the enterprise Website to request a chat interaction with a customer support representative. Alternatively, the customer may access a 'Help' section or a 'Contact Us' section to request for a chat interaction with a customer support representative. Such a click input provided by the customer on the enterprise Website may be received by the communication interface 108 and interpreted as a request for interaction with the enterprise.

In another illustrative example, a customer may provide a voice command to a virtual assistant (VA) installed in a customer's personal device to assist the customer with an enterprise related query. The VA, using automatic voice recognition and speech application grammar, may convert the voice command to a textual form and parse the textual content to identify that the voice command is related to the enterprise. For example, the voice command may include a name of the enterprise or a name of a product or a service associated with the enterprise. The VA may recognize the association of the voice command with the enterprise and accordingly forward the input to the communication interface 108 of the apparatus 100, which may then be configured to interpret the voice command input as a request for interaction with the enterprise.

Figure 2:
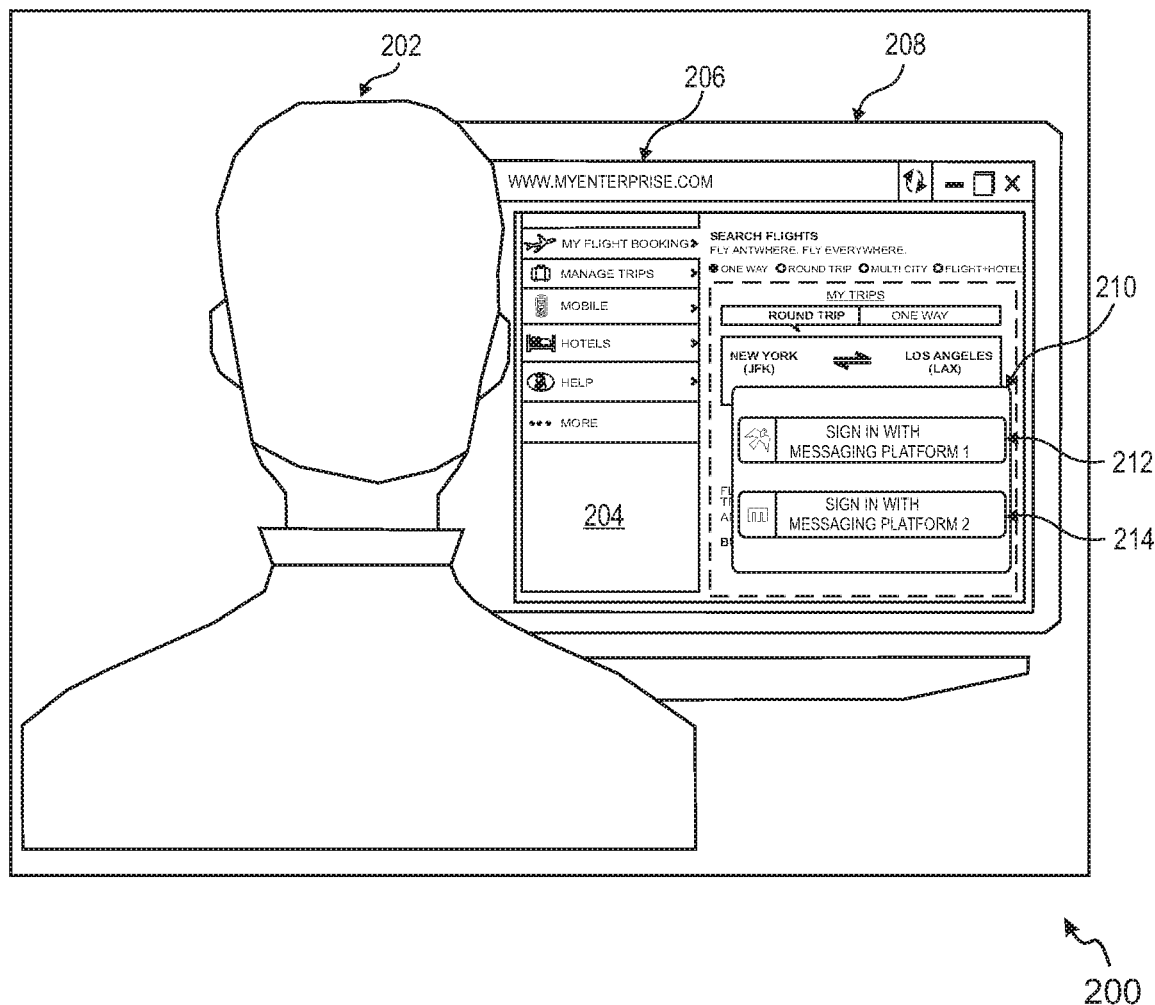
FIG. 2 shows an example representation of a user interface (UI) displayed to a customer on an enterprise Website for requesting authentication of a personal identity from the customer in accordance with an embodiment of the invention.
Figure 4:
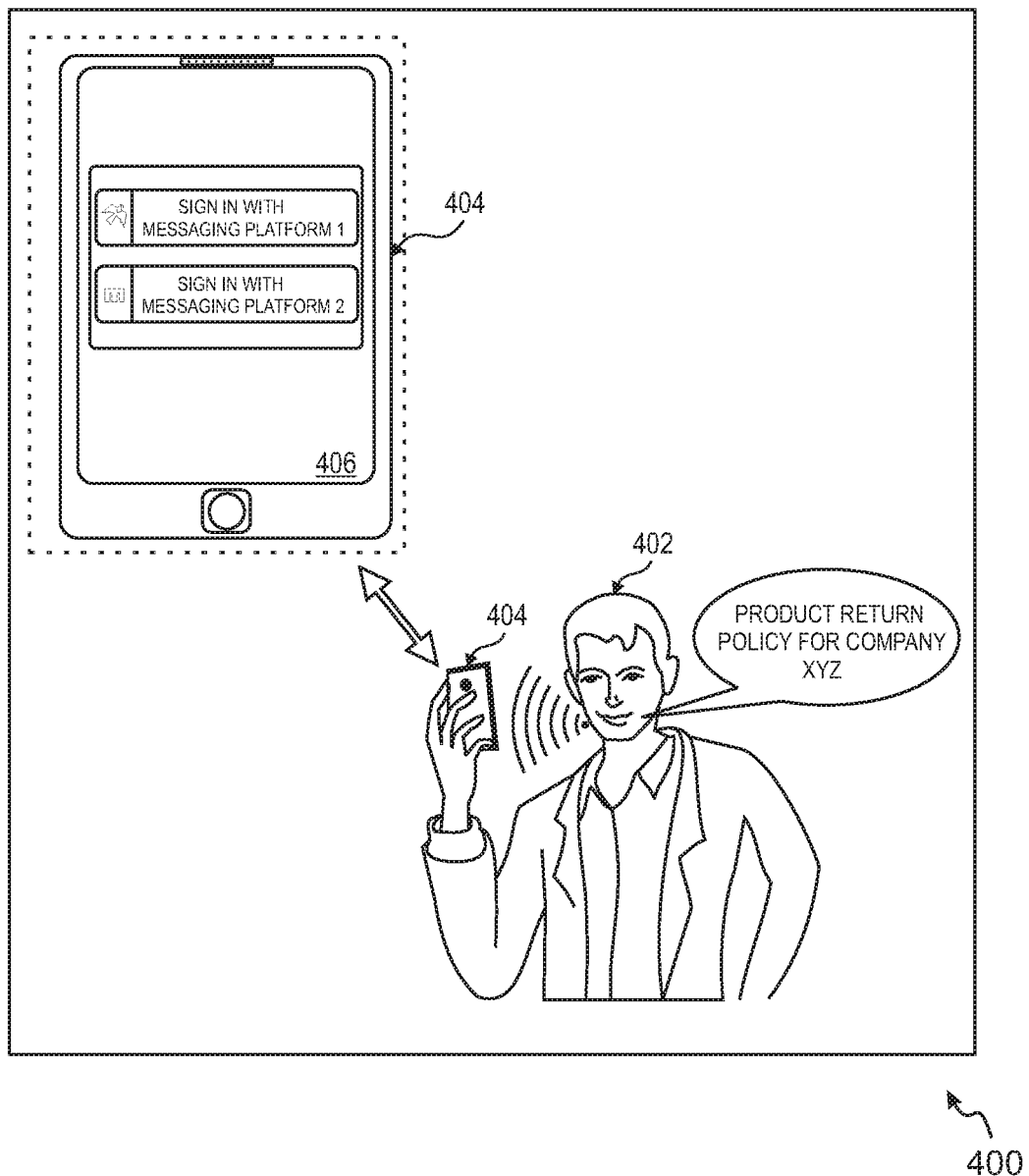
FIG. 4 shows an example representation of a customer seeking assistance from a VA linked with a customer's electronic device in accordance with an embodiment of the invention.

In at least one example embodiment, the processor 102 is configured to, with the content of the memory 104, cause the apparatus 100 to display a user interface (UI) on the electronic device in response to the received input. The display of the UI is shown in FIGS. 2 and 4. The UI is configured to request the customer to authenticate a personal identity using login credentials corresponding to at least one third-party messaging platform. An example of a third-party, i.e. non enterprise related, messaging platform may be a social media platform, such as Facebook® or Google Circles™, for example. Another example of a third-party messaging platform may be a chat platform, such as WhatsApp™, Hangouts™, Yahoo! Messenger™, Facebook Chat, and the like. Upon receiving a request for interaction, the apparatus 100 may be caused to request authentication using a messaging platform login credentials from the customer. As explained with reference to FIG. 1, the communication interface 108 includes application programming interfaces (APIs) that are configured to receive inputs that are related to the customer's messaging platform login credentials and connect to an authentication server associated with the messaging platform to authenticate the customer. Further, the APIs may be configured to return an authentication status, for example successful authentication or an authentication failure status, subsequent to authentication of the customer's login credentials by the authentication server. In an illustrative example, the customer may use a Facebook account login credentials to authenticate a personal identity. Accordingly, the customer may provide an input related to Facebook login credentials on the UI. The APIs associate with the communication interface 108 may be configured to receive the input and perform at least one of encoding and compression of the login credentials. The encoded and/or compressed login credentials are then transmitted over wired and/or wireless communication networks to an authentication platform associated with Facebook servers. The authentication platform may decode/decompress the received data to obtain the login credentials. The login credentials may then be matched with stored customer account information to authenticate the personal identity of the customer. A status of authentication, whether a successful authentication or an authentication failure status, may be received from the authentication platform by the APIs of the communication interface 108 and returned to the processor 102 of the apparatus 100.

In at least one example embodiment, the processor 102 is configured to, with the content of the memory 104, cause the apparatus 100 to facilitate a customer interaction with the enterprise subsequent to successful authentication of the personal identity. The customer interaction may be facilitated on either an enterprise interaction channel or a third-party messaging platform for which the login credentials were provided by the customer. In an illustrative example, if a customer uses a Gtalk™ login credentials for authenticating a personal identity, then the customer interaction with the enterprise may be facilitated on Gtalk chat platform. In another illustrative example, if the customer uses a LinkedIn™ login credentials for authentication, while currently on an enterprise Website, then the interaction may be facilitated on the enterprise Website itself. In yet another example scenario, if the customer provided a request for interaction using a VA and a Facebook login credentials to authenticate a personal identity, then the customer interaction may be facilitated using Facebook Chat feature on an enterprise page maintained by the enterprise on the Facebook application.

Such a linking of customer interaction from an enterprise medium or a virtual assistant medium to a third-party messaging platform provides several advantages. For example, the customer may interact with several enterprises linked to the apparatus 100 without having to create and maintain an account for interaction purposes. Moreover, in some embodiments, the messaging platform chosen by the customer enables the customer to interact with an enterprise using a medium that the customer is already accustomed to, without having to waste time and effort in navigating through myriad options presented by the enterprise for facilitating interactions. Moreover, facilitating login/authentication using messaging platform credentials provides continued access of the customer to the enterprise.

FIG. 2 shows an example representation 200 of a user interface (UI) displayed to a customer 202 on an enterprise Website 204 for requesting authentication of a personal identity from the customer 202, in accordance with an embodiment of the invention. More specifically, the example representation 200 depicts the customer 202 using a Web browser application 206 on an electronic device 208 to access one or more Web pages of the enterprise Website 204. The electronic device 208 is exemplarily depicted to be a desktop computer. The enterprise Website 204 (hereinafter referred to as Website 204) may be hosted on a remote Web server and the Web browser application 206 may be configured to retrieve one or more Web pages associated with the Website 204 from the remote Web server over a network (not shown in FIG. 2). Some examples of the network may include wired networks, wireless networks, or a combination thereof.

As an illustrative example, a Web page of the Website 204 retrieved from a remote Web server over the network is displayed on the display screen of the electronic device 208 in the example representation 200. As can be seen, the Website 204 is depicted to be a Website configured to assist customers with air travel reservations. In an illustrative example, the customer 202 may have recently purchased flight tickets and may want to make a change in the itinerary. Further, the customer 202 may have accessed the 'Help' Section provided on the Website 204 and read the frequently asked questions (FAQ) to learn the process for making a change to a scheduled itinerary. However, the FAQ content may not have adequately answered the queries that the customer 202 had. In such a scenario, the customer 202 may seek a chat interaction with an agent on the Website 204.

Typically, most enterprise Websites display a chat widget, which is a rolling feature that is displayed in one corner of the screen for every Web page of the Website that a customer visits. A customer, such as the customer 202, may click on the chat widget to request an interaction with an agent, i.e. request an interaction with the enterprise. As explained with reference to FIG. 2, the communication interface 108, because it is operatively coupled, for example via remote data gathering servers, with a plurality of enterprise interaction channels, such as enterprise Websites, may receive the request for interaction from the customer 202, in real-time. The apparatus 100 may cause the Website 204 to display a UI 210 in form of a chat window on the display screen of the electronic device 208, as depicted in the example representation 200. The UI 210 may be displayed to request the customer 202 to authenticate a personal identity using login credentials corresponding to two commonly used messaging platforms. As an illustrative example, the UI 210 is depicted to include two icons 212 and 214 displaying text 'Sign in with Messaging Platform 1' and 'Sign in with Messaging Platform 2,' respectively. As explained with reference to FIG. 2, the messaging platform may be social media platform, such as Facebook® or Google Circles™, or a chat platform, such as WhatsApp™, Gtalk™, Yahoo! Messenger™, and the like. The customer 202 may choose to sign-in, i.e. authenticate personal identity, using login credentials of any one of the messaging platforms to initiate interaction with the agent.

In one embodiment, the interaction may be conducted on the Website 204 itself. In another embodiment, the interaction may be continued on an enterprise page on the messaging platform for which the customer 202 had provided the login credentials. For example, if the customer 202 signed in using Facebook credentials, then the chat interaction may be directed to Facebook Web page associated with the enterprise. For example, the chat interaction may be directed to a Facebook page maintained by the enterprise on the messaging platform and the customer 202 may interact with the agent using a Facebook chat utility. One such scenario is depicted in FIG. 3.

Figure 3:
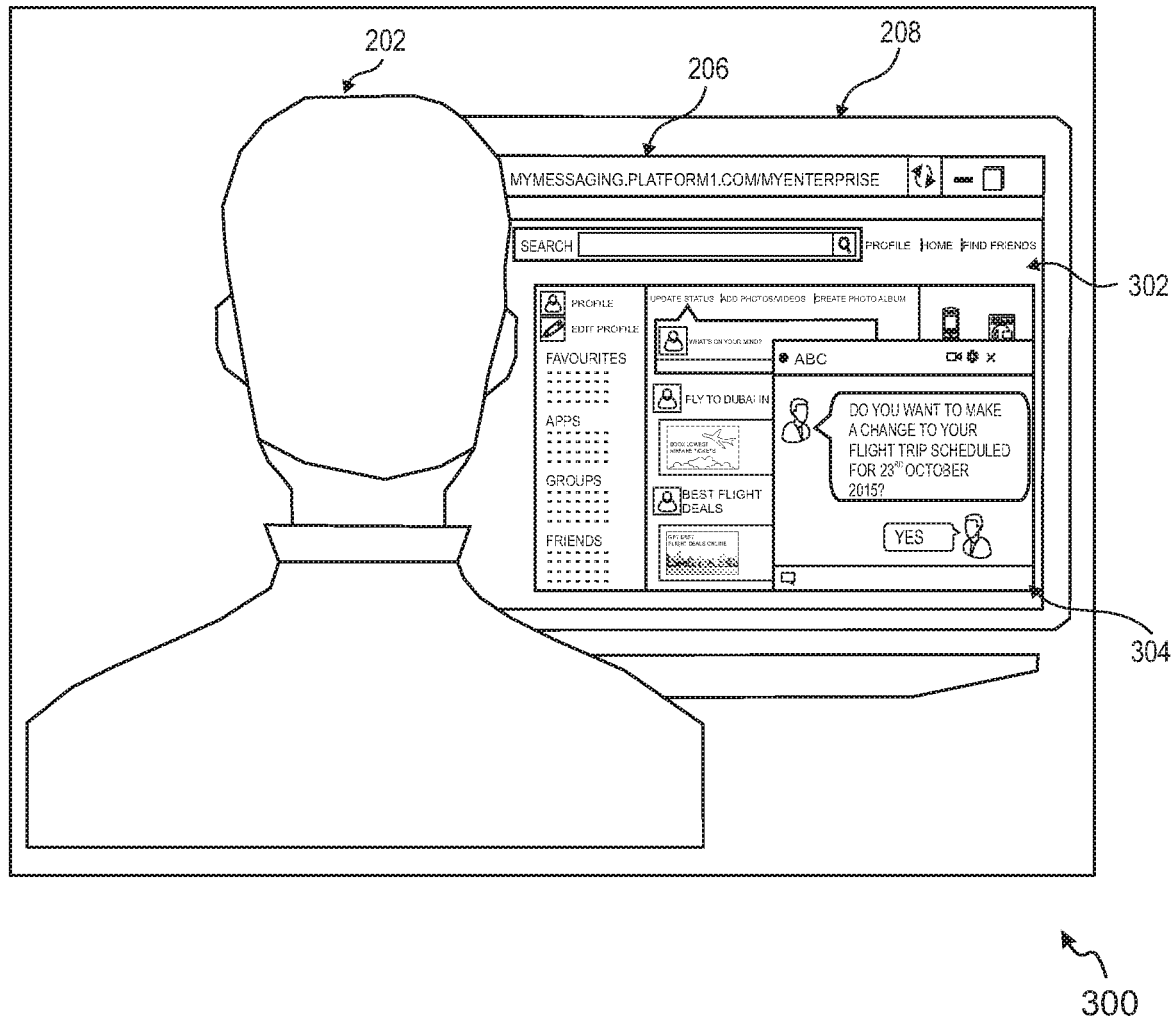
FIG. 3 is an example representation showing a customer interaction being executed on a third-party messaging platform in accordance with an embodiment of the invention.

Referring now to FIG. 3, an example representation 300 showing a customer interaction being executed on a third-party messaging platform 302 in accordance with an example embodiment. As explained above, upon receiving login credentials corresponding to a third-party messaging platform, such as Facebook, for example, and authenticating the personal identity of the customer 202, a Web page corresponding to the customer messaging platform (preferably, a Web page of the third-party messaging platform maintained by the enterprise) may be opened by the Web browser application 206 on the display screen of the electronic device 208 of the customer 202. More specifically, Web channel APIs associated with the communication interface 108 may cause the Web browser application 206 to retrieve a Web page associated with the third-party messaging platform 302 for which the login credentials were provided by the customer 202 for authentication purposes. The chat interaction may thereafter be executed using a chat feature associated with the third-party messaging platform 302. For example, an enterprise Web page on Facebook platform may be retrieved and displayed to the customer 202. Moreover, the chat interaction may be facilitated through Facebook Chat™ feature associated with the Facebook platform. The Facebook Chat™ is exemplarily depicted using a chat window 304 in the example representation 300.

Linking of customer interaction from an enterprise medium, such as the Website 204 shown in FIG. 2, to the third-party messaging platform 302 enables the customer to interact with an enterprise using a medium that the customer is already accustomed to, without having to waste time and effort in navigating through options presented by the enterprise for facilitating interactions. Moreover, facilitating login/authentication using messaging platform credentials provides continued access of the customer 202 to the enterprise, and also increases enterprise brand awareness by directing the customer 202 to a social media Web page of the enterprise.

As explained with reference to FIG. 2, the customer 202 wishes to interact with an agent to resolve a query related to rescheduling a flight journey. Upon being re-directed to a Web page of the third-party messaging platform 302 (exemplarily depicted to be an enterprise Web page on the third-party messaging platform 302), the chat interaction may be continued with the agent on the third-party messaging platform as depicted using the UI displayed in the chat window 304.

Referring now to FIG. 1, in an embodiment the apparatus 100 is caused to retrieve stored information corresponding to the customer subsequent to the successful authentication of the personal identity. In an embodiment, the stored information may include profile data and interaction data corresponding to one or more past interactions of the customer with the enterprise. A customer's profile data may include profile information related to the customer such as, for example, a customer's name and contact details, information relating to products and services associated with the customer, social media account information, information related to other messaging or sharing platforms used by the customer, recent transactions, customer interests and preferences, customer's credit history, history of bill payments, credit score, memberships, history of travel, and the like. In some exemplary embodiments, the customer information may also include calendar information associated with the customer. For example, the calendar information may include information related to an availability of the customer during the duration of the day/week/month.

In an embodiment, interaction data stored corresponding to the customer may include information such as enterprise related Web pages visited, queries entered, chat entries, purchases made, exit points from Websites visited, decisions made, mobile screens touched, work flow steps completed, sequence of steps taken, engagement time, IVR speech nodes touched, IVR prompts heard, widgets/screens/buttons selected or clicked, historical session experience and results, customer relationship management (CRM) state and state changes, agent wrap-up notes, speech recordings/transcripts, chat transcripts, survey feedback, channels touched/used, sequence of channels touched/used, instructions, information, answers, actions given/performed by either enterprise system or agents for the customer, and the like. In some example scenarios, the interaction data may include information related to past interactions of the customer with resources at a customer support facility, the types of channels used for interactions, customer channel preferences, types of customer issues involved, whether the issues were resolved or not, the frequency of interactions, and the like.

The apparatus 100 is further caused to predict one or more intentions of the customer for requesting the interaction based on the received input and the retrieved stored information. More specifically, if the customer is a potential customer or a first time visitor to an enterprise interaction channel, then the apparatus 100 may be caused to predict an intention of the customer based on the input indicative of a request for interaction and any information related to the current journey of the customer on the enterprise interaction channel. However, if the customer is an existing customer, then the apparatus 100 may be caused to predict an intention of the customer based on the input and stored information corresponding to one or more past interactions of the customer with the enterprise. In an illustrative example, if a customer has requested for an interaction after visiting a FAQ page on the enterprise Website related to a flight cancellation policy and stored information of the customer suggests that the customer has recently purchased a flight ticket, then the processor 102 may be configured to predict that the customer wants to cancel the flight reservation for the recently purchased flight ticket. Similarly, if the stored calendar information suggests that the customer is traveling overseas next week and the customer's current journey on the enterprise interaction channel suggests a travel insurance related requirement, then the processor 102 may be configured to predict that the customer is considering purchasing travel insurance for that particular overseas trip.

In an embodiment, for customer intention prediction purposes, the memory 104 stores one or more prediction models (not shown in FIG. 1), which are configured to subject the customer input and any previously gathered information corresponding to the customer to a set of structured and un-structured data analytical models including text mining and predictive models. Examples of the prediction models may include, but are not limited to, Logistic regression, Naïve Bayesian, Rule Engines, Neural Networks, Decision Trees, Support Vector Machines, k-nearest neighbor, K-means, and the like. In an embodiment, the prediction models may be configured to extract features from the customer's current journey and any previously gathered information and provision the features to the prediction models. Examples of the features that may be provisioned to the prediction models may include, but are not limited to, any combinations of word features such as n-grams, unigrams, bigrams, and trigrams, word phrases, part-of-speech of words, sentiment of words, sentiment of sentences, position of words, customer keyword searches, customer click data, customer Web journeys, cross-channel journeys, call-flow, the customer interaction history, and the like. In an embodiment, the prediction models may use any combination of the above-mentioned input features to predict the customer's likely intention. In some embodiments, the intention can be inferred and or predicted, based on prior or current activity, or can be specifically indicated by the customer. In some embodiments, machine learning and other artificial intelligence (AI) techniques may be used to monitor the predictions and the customer responses to improve the predictions.

In an embodiment, the apparatus 100 is also configured to receive at least one of channel presence information and current channel attention information from the linked customer devices. In an illustrative example, the customer may have logged into a native mobile application and may also be browsing one or more Websites. In such a scenario, the customer's presence in the native mobile application channel and the Web channel may be recorded as the channel presence information. More specifically, a customer login to a native mobile application (or in some scenarios, even activating the native mobile application on the device) may be tracked (for example, using JavaScript tags) by the customer's device. Such information may be communicated, in substantially real-time, by the native mobile application using APIs to a device transceiver to communicate the login/activation information to the communication interface 108 of the apparatus 100. The processor 102 upon receiving such information from the communication interface 108 may be configured to record the customer's presence in the native mobile application interaction channel. Similarly, a customer access and subsequent activity on a Website may be tracked using Web browser cookies or Hyper Text Markup Language (HTML) tags by a Web server hosting the enterprise Website. The Web server may be configured to communicate such information to the communication interface 108 in substantially real-time. The processor 102 upon receiving such information from the communication interface 108 may record the customer's presence in the Web interaction channel. Further, even though the customer is present in one or more interaction channels, the interaction channel that the customer is currently attentive to is recorded as the current channel attention information. In an illustrative example, even though the customer has logged in one or more social media accounts, the customer may be currently browsing a Website, as indicated by activated HTML or JavaScript tags or browser cookies, then the apparatus 100 is caused to determine the current channel attention information as the Web interaction channel, and not the social media interaction channel.

Furthermore, the apparatus 100 may be configured to receive customer location information from the linked customer devices. For example, the communication interface 108 may be caused to obtain the location of the customer from the customer device which may, for example, detect the location of the customer using a global positioning system (GPS) or other triangulation techniques and provide such location information to the communication interface 108. The location of the customer may also be determined by a native mobile application that is running on the customer device. The native application may work independently or in coordination with systems operated by the telecommunications provider to facilitate location determination.

In at least one example embodiment, the apparatus 100 may be caused to use the predicted intention along with information such as channel presence/attention information and location information to determine the most appropriate enterprise response to be provided to the customer as part of the customer interaction. To that effect, the processor 102 may be configured to predict the next best action for the customer. In an embodiment, the best next action is predicted based on an analysis of the lowest effort sequence of tasks, interactions, and information that can get the customer to their intended goal. For example, the customer's profile data and interaction data may be analyzed to determine the guidance and influence steps to be performed to keep the customer engaged or to facilitate consumption of goods/services by the customer. In an embodiment, the guidance and influence steps are not based on a fixed or standard support 'menu,' for example, but instead are predicted dynamically for the particular customer. In an embodiment, the prediction of the best next action is based on corporate policy, for example, to provide product and service information, to offer product and service incentives, and the like. In an embodiment, the prediction of the best next action is influenced by enterprise objectives. Some non-exhaustive examples of enterprise objectives include increasing consumption of enterprise offerings and improving customer sales and service experience. The prediction of the best next action can be based on considering and evaluating some or all of the criteria mentioned above.

In an embodiment, the apparatus 100 may be caused to retrieve one or more past actions of the customer from the stored past information based on a relevance of the one or more past actions to the current information, and determine at least one next action based on the one or more past actions of the customer. For example, if the current information relates to a meeting cancelation event, then the apparatus 100 may be caused to retrieve previous actions of the customer in response to such an event. For example, the customer may have previously rescheduled the meeting as a Web conference and sent invitations to mobile devices of probable attendees based on confirmed availability. Accordingly, the apparatus 100 may be caused to predict the next actions to be rescheduling the meeting as a Web conference at a time when the probable attendees are free to attend the meeting and then sending invites to the probable attendees of the Web conference.

In some embodiments, the apparatus 100 may be caused to identify relevant actions of customers associated with profiles similar to a profile of the customer and determine the next action based on the identified actions. For example, if the current information relates to a fraudulent card transaction event, then the apparatus 100 may be caused to identify actions of other customers, who have similar profile, for example, similar age, profession, travel preferences, etc., as that of the customer for such an event and determine one or more next actions based on the identified actions of the other customers. For example, other customers with similar profile as that of the customer may have canceled their credit card and ordered a replacement credit card. Accordingly, the apparatus 100 may be caused to determine the next actions to be cancelation of the card and ordering of a replacement card.

In an embodiment, a best next action predicted by the apparatus 100 may correspond to at least one of rebooking a flight reservation, paying a bill, making a hotel reservation, making a car rental reservation, making a restaurant reservation, purchasing one or more tickets to an event (such as a game, movie screening, theater presentation, etc.), purchasing a product, initiating contact with an emergency service provider, seeking technical support, troubleshooting a concern, rescheduling one or more appointments, accessing a map location to search for one or more preferred locations near a current location of the customer, and the like. In an embodiment, the best next action may relate to a financial transaction, such as an action related to fraud prevention, proactive offer of payment splitting and/or payment rescheduling, credit card cancelation, seeking a replacement credit card, and so on and so forth.

In an embodiment, the apparatus 100 is caused to provide an enterprise response to the customer to provide a personalized interaction experience to the customer. More specifically, the processor 102 may determine the most appropriate enterprise response based on the predicted one or more intentions or the predicted best next action, and thereafter the processor 102 may provision the enterprise response to the communication interface 108. The communication interface 108, using associated transceiver circuitry, may be configured to provision the enterprise response over a communication network, for example a wired and/or wireless network, to an electronic device with which the customer had requested interaction with the enterprise. The customer device may then be configured to provision the enterprise response (for example, by displaying the enterprise response on a display screen) to the customer on the enterprise interaction channel, such as the Website or on the messaging platform. In some embodiments, the apparatus 100 may be caused to provide the personalized response to the customer's request for interaction using the messaging platform 302 and initiate an interaction with the customer 202 on the messaging platform 302, thus linking the customer interaction with the messaging platform 302. In an illustrative example explained with reference to FIG. 3, the agent may initiate the interaction by asking the customer 202 if the customer 202 intends to make a change to reservation booked on 23rd of October, as shown in the chat window 304. Such a personalized response provided to the customer 202 in reply to the request for interaction improves a customer browsing experience. The customer 202 may then respond in affirmative and request specific change to the itinerary.

In some example scenarios, a customer may not visit an enterprise portal or a Website for initiating an interaction and instead provide a voice command to a VA installed on the customer's personal device. Such a scenario is explained with reference to FIG. 4.

Referring now to FIG. 4, an example representation 400 of a customer 402 seeking assistance from a VA linked with a customer's electronic device 404 is shown in accordance with an embodiment of the invention. In an illustrative example, the customer 402 may type or speak 'product return policy for company XYZ' to the linked VA. Upon receiving such an input the VA may, in one example scenario, request the customer 402 to authenticate a personal identity using login credentials of at least one messaging platform as exemplarily displayed on a display screen 406 of the device 404 in FIG. 4. The customer 402 may sign in using login credentials of any one messaging platform and thereafter the interaction of the customer 402 with an enterprise XYZ may be directed to the messaging platform as explained with reference to FIG. 3.

Referring now to FIG. 1, in at least one example embodiment, the apparatus 100 is caused to receive the login credentials corresponding to the third-party messaging platform provided by the customer using the electronic device. As explained with reference to FIGS. 2 and 4, a UI such as the UI 210, may be displayed to the customer requesting the customer to provide login credentials corresponding to at least one third-party messaging platform. The customer may provide login credentials corresponding to one third-party messaging platform and thereafter the login credentials may be authenticated at remote authentication servers and thereafter the customer interaction may be facilitated as explained above. In some embodiments, the login credentials provided by the customer may be received by the communication interface 108 through the login APIs. The communication interface 108 may provision the login credentials to the processor 102, which may be configured to identify the customer, for example by matching attributes such as name, device ID, messaging platform ID, and the like, and thereafter link the login credentials to at least one of the customer and the electronic device.

In at least one example embodiment, linking the login credentials to the customer or the electronic device implies storing the login credentials as an attribute among a plurality of attributes stored corresponding to the customer. Such linking of the login credentials may facilitate authentication of the personal identity of the customer for one or more requests for interaction received from the customer subsequent to completion of the customer interaction, or more specifically, for one or more future customer interactions with the enterprise. In at least one example embodiment, the processor 102 is configured to store the login credentials and the linking of the login credentials in the memory 104. If the customer attempts to interact with the enterprise again, either on the enterprise interaction channel or on the third-party messaging platform, then the stored login credentials and the linking to the electronic device may be used to authenticate the customer without the customer having to provide the login credentials. In such a scenario, the customer may be provided with the UI, such as the UI 210, and based on the click input indicative of the desired messaging platform, the login credentials may be used to authenticate the customer. In some embodiments, the provisioning of the UI 210 may also be precluded and the customer may be directly authenticated based on the stored information. As such, the customer may be seamlessly connected to the enterprise and interactions with enterprise may be initiated at any point in time creating an 'always connected' effect and improving a customer's interaction experience with the enterprise.

In at least one example embodiment, the processor 102 of the apparatus 102 may be configured to receive contextual information related to the request for interaction. For example, if the customer has browsed one or more Web pages of the enterprise Website before requesting interaction with an agent, then such information related to the current journey of the customer on the enterprise Website may be collated, for example, using HTML or JavaScript tags or browser cookies, and provisioned to the processor 102. The processor 102 may treat the received information as contextual information for purposes of the interaction and in some cases, transfer or provision relevant contextual information to the agent of the enterprise for enabling the agent of the enterprise to assist the customer in a better manner. However, as explained above, in some embodiments, the processor 102 may use the contextual information to predict intention and best next action of the customer and based on the predictions enable the agent to provide a personalized response to the customer. In some embodiments, the interaction may be effected on the third-party messaging platform, and the processor 102 may effect transfer of contextual information to the agent of the enterprise assigned to assist the customer on the third-party messaging platform.

A method for linking customer interactions to a third-party messaging platform is explained with reference to FIG. 5.

Figure 5:
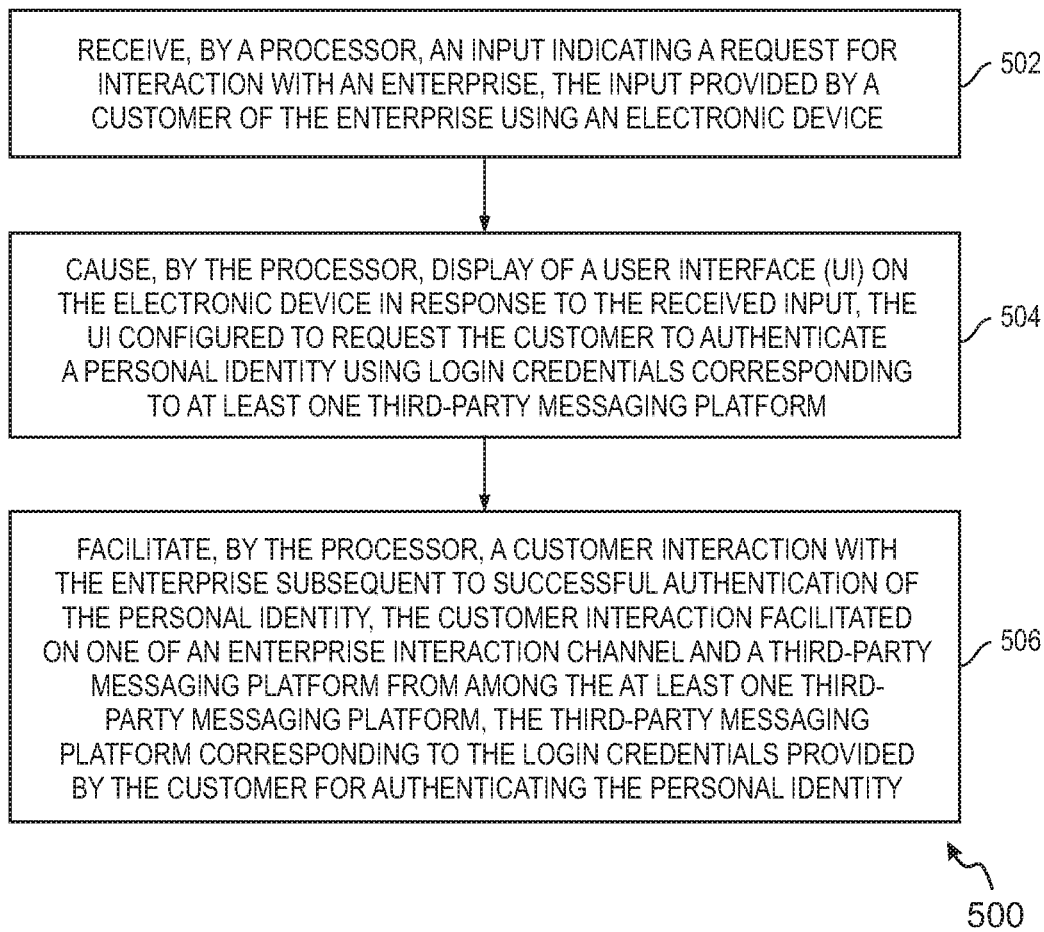
FIG. 5 is an example flow diagram of a method for linking a customer interaction with a third-party messaging platform in accordance with an embodiment of the invention.

FIG. 5 is a flow diagram of an example method 500 for linking a customer interaction to a third-party messaging platform in accordance with an embodiment of the invention. The method 500 depicted in the flow diagram may be executed by, for example, the apparatus 100 explained with reference to FIGS. 2 to 4. Operations of the flowchart, and combinations of operation in the flowchart, may be implemented by, for example, hardware, firmware, a processor, circuitry and/or a different device associated with the execution of software that includes one or more computer program instructions. The operations of the method 500 are described herein with help of the apparatus 100. For example, one or more operations corresponding to the method 500 may be executed by a processor, such as the processor 102 of the apparatus 100. Although the one or more operations are explained herein to be executed by the processor alone, it is understood that the processor is associated with a memory, such as the memory 104 of the apparatus 100, which is configured to store machine executable instructions for facilitating the execution of the one or more operations. The operations of the method 500 can be described and/or practiced by using an apparatus other than the apparatus 100. The method 500 starts at operation 502.

At operation 502 of the method 500, an input indicating a request for interaction with an enterprise is received by a processor such as the processor 102 of the apparatus 100 explained with reference to FIG. 1. The input is provided by a customer of the enterprise using an electronic device. In an illustrative example scenario, a customer of an enterprise may wish to interact with an enterprise to enquire about a product/service of interest, to resolve a concern, to make a payment, or to lodge a complaint. Accordingly, the customer may access an enterprise Website on an electronic device, such as a desktop computer, a laptop, a Smartphone or a tablet computer. Further, the customer may click on a chat widget displayed in a right-hand corner section of the enterprise Website to request a chat interaction with a customer support representative. Alternatively, the customer may access a 'Help' section or a 'Contact Us' section to request for a chat interaction with a customer support representative. Such a click input provided by the customer on the enterprise Website may be interpreted as a request for interaction with the enterprise. In another illustrative example, the customer may provide a voice command to a virtual assistant (VA) installed in a customer's personal device to assist the customer with an enterprise related query. The VA, using automatic voice recognition and speech application grammar, may convert the voice command to a textual form and parse the textual content to identify that the voice command is related to the enterprise. For example, the voice command may include a name of the enterprise or a name of a product or a service associated with the enterprise. The VA may recognize the association of the voice command with the enterprise and accordingly forward the input to the processor, which may then be configured to interpret the voice command input as a request for interaction with the enterprise.

At operation 504 of the method 500, display of a user interface (UI) is caused by the processor on the electronic device in response to the received input. The display of the UI is shown in FIGS. 2 and 4 and is not explained again herein. The UI is configured to request the customer to authenticate a personal identity using login credentials corresponding to at least one third-party messaging platform. An example of a third-party, i.e. non enterprise related, messaging platform may be a social media platform, such as Facebook® or Google Circles™, for example. Another example of a third-party messaging platform may be a chat platform, such as WhatsApp™ Hangouts™, Yahoo! Messenger™, Facebook Chat, and the like.

Upon receiving a request for interaction, a request for authentication using a messaging platform login credentials may be provided to the customer. As explained with reference to FIG. 1, application programming interfaces (APIs) that are configured to receive input related to customer's messaging platform login credentials and connect to authentication server associated with the messaging platform to authenticate the customer may be used to facilitate customer authentication. Further, the APIs may be configured to return an authentication status, for example successful authentication or an authentication failure status, subsequent to authentication of the customer's login credentials by the authentication server. In an illustrative example, the customer may use a Facebook account login credentials to authenticate a personal identity. Accordingly, the customer may provide an input related to Facebook login credentials on the UI. The APIs may be configured to receive the input and perform at least one of encoding and compression of the login credentials. The encoded and/or compressed login credentials are then transmitted over wired and/or wireless communication networks to an authentication platform associated with Facebook servers. The authentication platform may decode/decompress the received data to obtain the login credentials. The login credentials may then be matched with stored customer account information to authenticate the personal identity of the customer. A status of authentication, whether a successful authentication or an authentication failure status, may be received from the authentication platform by the APIs by the processor.

At operation 506 of the method 500, a customer interaction with the enterprise is facilitated by the processor subsequent to successful authentication of the personal identity. The customer interaction may be facilitated on either an enterprise interaction channel or a third-party messaging platform for which the login credentials were provided by the customer. For example, if a customer has used Gtalk™ login credentials to authenticate a personal identity, then the customer interaction with the enterprise may be facilitated on the Gtalk chat platform. Such a linking of customer interaction from an enterprise medium or a virtual assistant medium to a third-party messaging platform provides several advantages. For example, the customer may interact with several enterprises, without having to create and maintain an account for interaction purposes. Moreover, the messaging platform chosen by the customer enables the customer to interact with an enterprise using a medium that the customer is already accustomed to, without having to waste time and effort in navigating through myriad options presented by the enterprise for facilitating interactions. Moreover, facilitating login /authentication using messaging platform credentials provides continued access of the customer to the enterprise. In some embodiments, the login credentials corresponding to the third-party messaging platform may be linked to the customer and/or the electronic device to facilitate authentication of the personal identity of the customer for one or more future interactions of the customer with the enterprise. The linking may be performed as explained with reference to FIG. 1.

Another method for linking customer interactions to a third-party messaging platform is explained with reference to FIG. 6.

Figure 6:
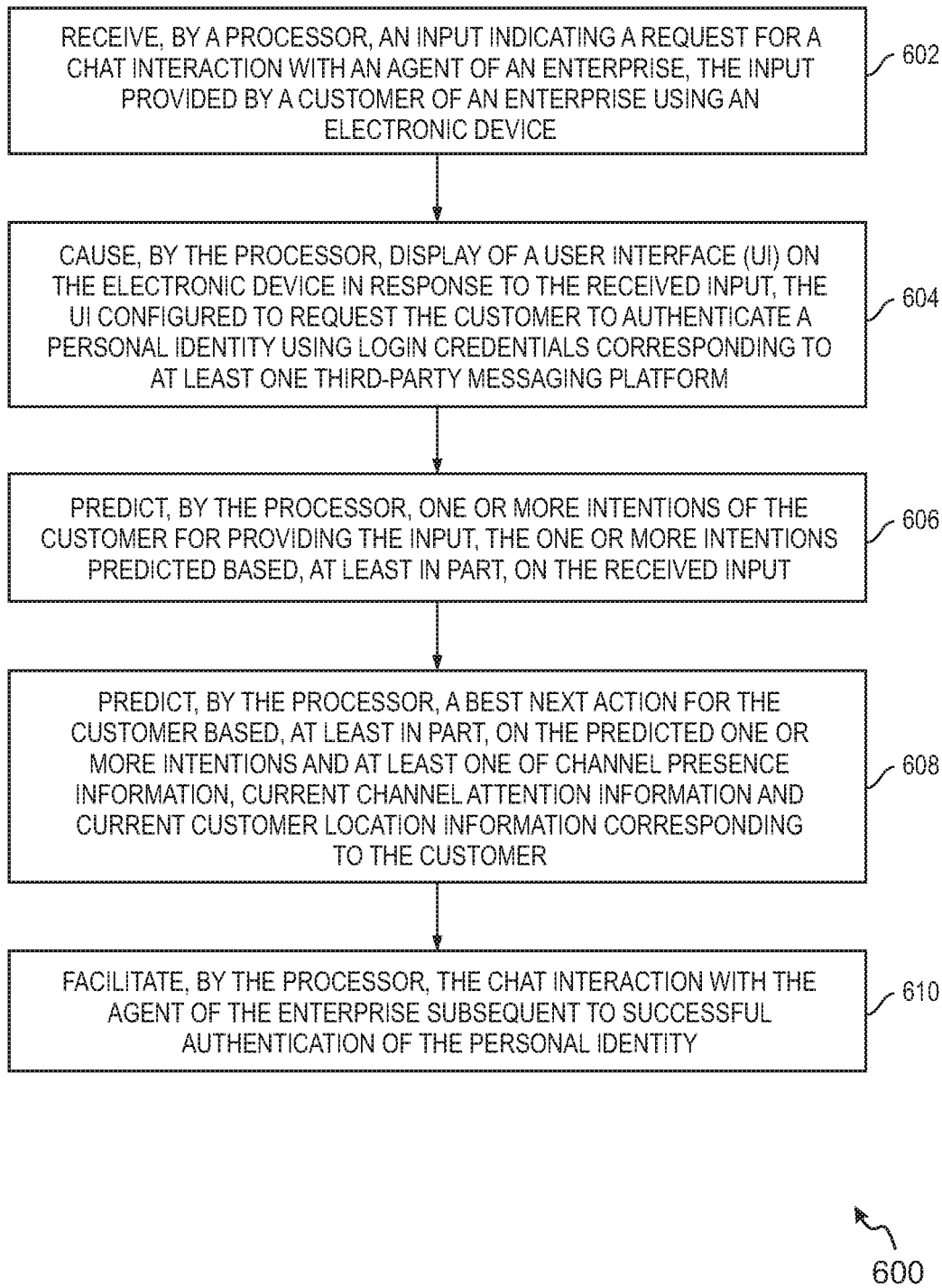
FIG. 6 is an example flow diagram of a method for linking a customer interaction with a third-party messaging platform in accordance with another embodiment of the invention.

FIG. 6 is a flow diagram of an example method 600 for facilitating a customer interaction with an enterprise, in accordance with another embodiment of the invention. The method 600 depicted in the flow diagram may be executed by, for example, the apparatus 100 explained with reference to FIGS. 2 to 4. Operations of the flowchart, and combinations of operation in the flowchart, may be implemented by, for example, hardware, firmware, a processor, circuitry, and/or a different device associated with the execution of software that includes one or more computer program instructions. The method 600 starts at operation 602.

At operation 602 of the method 600, an input indicating a request for chat interaction with an agent of an enterprise is received by a processor, such as the processor 102 of the apparatus 100. The input is provided by a customer of an enterprise using an electronic device. For example, an enterprise Website may display a chat widget, which is rolling feature displayed in one corner of the screen for every Web page of the Website that a customer visits. A customer may click on the chat widget to provide an input indicating a request an interaction with an agent of the enterprise.

At operation 604 of the method 600, display of a user interface (UI) on the electronic device is caused by the processor in response to the received input. The UI is configured to request the customer to authenticate a personal identity using login credentials corresponding to at least one third-party messaging platform. An example of such an UI is the UI 210 explained with reference to FIG. 2.

At operation 606 of the method 600, one or more intentions of the customer are predicted by the processor for providing the input. The one or more intentions are predicted based, at least in part, on the received input. At operation 608 of the method 600, a best next action is predicted by the processor for the customer based, at least in part, on the predicted one or more intentions and at least one of channel presence information, current channel attention information, and current customer location information corresponding to the customer. The prediction of the one or more intentions and the best next action may be performed as explained with reference to FIG. 1 and is not explained again herein.

At operation 610 of the method 600, a customer chat interaction is facilitated by the processor with the agent of the enterprise subsequent to successful authentication of the personal identity. The chat interaction includes an enterprise response to the customer to provide a personalized interaction experience to the customer, the enterprise response provided to the customer based on the predicted best next action. An example of chat interaction including the enterprise response is depicted in the chat window 304, explained with reference to FIG. 3 and is not explained again herein.

Various embodiments disclosed herein provide numerous advantages. The techniques disclosed herein suggest linking customer interactions to third-party or customer messaging platforms. Such a linking of customer interaction from an enterprise medium or a virtual assistant medium to a customer messaging platform provides several advantages. For example, the customer may interact with several enterprises (linked to the apparatus 100), without having to create and maintain an account for interaction purposes. Moreover, the messaging platform chosen by the customer enables the customer to interact with an enterprise using a medium that the customer is already accustomed to, without having to waste time and effort in navigating through myriad options presented by the enterprise for facilitating interactions. Moreover, facilitating login /authentication using messaging platform credentials provides continued access of the customer to the enterprise and also increases brand awareness of the enterprise.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry, for example complementary metal oxide semiconductor (CMOS) based logic circuitry, firmware, software, and/or any combination of hardware, firmware, and/or software, for example embodied in a machine-readable medium. For example, the apparatuses and methods may be embodied using transistors, logic gates, and electrical circuits, for example application specific integrated circuit (ASIC) circuitry and/or in Digital Signal Processor (DSP) circuitry.

Particularly, the apparatus 100, the processor 102, the memory 104, the I/O module 106, and the communication interface 108 may be enabled using software and/or using transistors, logic gates, and electrical circuits, for example integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example operations explained herein with reference to FIGS. 5 and 6. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media, such as floppy disks, magnetic tapes, hard disk drives, etc.; optical magnetic storage media, e.g. magneto-optical disks, CD-ROM (compact disc read only memory), CD-R (compact disc recordable), CD-R/W (compact disc rewritable), DVD (Digital Versatile Disc), BD (BLU-RAY® Disc); and semiconductor memories, such as mask ROM, PROM (programmable ROM), EPROM (erasable PROM), flash memory, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g. electric wires and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the invention as set forth in the following claims.

The invention claimed is:

1. A computer-implemented method, comprising:

receiving, by a processor, an input indicating a request for a chat interaction with an enterprise, the input provided by a customer of the enterprise using an electronic device;

in response to the received input, causing, by the processor, display of a user interface (UI) on the electronic device;

requesting, by the processor via the UI, the customer to authenticate the customer's personal identity for the enterprise by using login credentials associated with at least one third-party messaging platform;

receiving, by the processor, the login credentials for authenticating the customer for the third-party messaging platform, the login credentials provided by the customer using the electronic device;

with the login credentials associated with the third-party messaging platform, authenticating, by the processor, the customer's personal identity for the enterprise;

linking, by the processor, the login credentials for the third-party messaging platform between at least one of the customer or the electronic device and the enterprise to facilitate authentication of the customer's personal identity for one or more requests for chat interactions with the enterprise that are received from the customer subsequent to completion of the chat interaction;

subsequent to successful authentication of the customer's personal identity, facilitating, by the processor, the chat interaction via the electronic device with the enterprise on one of an enterprise interaction channel or the third-party messaging platform;

retrieving, by the processor, stored information corresponding to the customer subsequent to successful authentication of the customer's personal identity, the stored information comprising information related to one or more past interactions of the customer with the enterprise;

predicting, by the processor, one or more intentions of the customer for providing the input, the one or more intentions predicted based on the received input and the retrieved stored information;

receiving, by the processor, channel presence information for a plurality of interaction channels corresponding to the customer indicating that the customer is logged into a native mobile application and that the customer is also browsing one or more Websites;

receiving, by the processor, current channel attention information corresponding to the customer indicating an interaction channel that the customer is currently attentive to; and predicting, by the processor, a best next action for the customer based, at least in part, on the predicted one or more intentions and the received channel presence information and current channel attention information corresponding to the customer.

2. The method of claim 1, further comprising:
identifying from the input provided by the customer, by the processor, a chat interaction request for initiating a chat interaction with an agent associated with the enterprise.

3. The method of claim 1, wherein the input is provided by the customer to a virtual assistant (VA) associated with the electronic device.

4. The method of claim 1, further comprising:
predicting, by the processor, the best next action based on an enterprise objective corresponding to at least one of increasing consumption of enterprise offerings and improving customer sales and service experience.

5. The method of claim 4, further comprising:
providing, by the processor, an enterprise response to the customer to provide a personalized interaction experience to the customer based on the predicted best next action.

6. The method of claim 1, further comprising:
storing, by the processor, any of the login credentials or authentication information and the linking of said the login credentials or authentication information with the customer's personal identity for the enterprise.

7. The method of claim 6, further comprising:
using the customer's personal identity linked with stored login credentials or authentication information, to facilitate one or more subsequent customer interactions with agents of the enterprise on the messaging platform.

8. The method of claim 1, further comprising:
receiving, by the processor, contextual information related to the request for interaction; and
transferring, by the processor, the contextual information to an agent of the enterprise for facilitating the customer interaction on one of the enterprise interaction channel and the third-party messaging platform.

9. An apparatus, comprising:
at least one processor; and
a memory having stored therein machine executable instructions, that when executed by the at least one processor, cause the apparatus to:
receive an input indicating a request for a chat interaction with an enterprise, the input provided by a customer of the enterprise using an electronic device;
in response to the received input, cause display of a user interface (UI) on the electronic device;
request via the UI the customer to authenticate the customer's personal identity for the enterprise by using login credentials associated with at least one third-party messaging platform;
receive the login credentials for authenticating the customer for the third-party messaging platform, the login credentials provided by the customer using the electronic device;
with the login credentials associated with the third-party messaging platform, authenticate the customer's personal identity for the enterprise;
link the login credentials for the third-party messaging platform between at least one of the customer or the electronic device and the enterprise to facilitate authentication of the customer's personal identity for one or more subsequent requests for chat interactions with the enterprise that are received from the customer subsequent to completion of the chat interaction;
subsequent to successful authentication of the customer's personal identity, facilitate the chat interaction with the enterprise on one of an enterprise interaction channel and the third-party messaging platform;
retrieve stored information corresponding to the customer subsequent to successful authentication of the customer's personal identity, the stored information comprising information related to one or more past interactions of the customer with the enterprise;
predict one or more intentions of the customer for providing the input, the one or more intentions predicted based on the received input and the retrieved stored information;
receive, by the processor, channel presence information for a plurality of interaction channels corresponding to the customer indicating that the customer is logged into a native mobile application and that the customer is also browsing one or more Websites;
receive, by the processor, current channel attention information corresponding to the customer indicating an interaction channel that the customer is currently attentive to;
predict a best next action for the customer based, at least in part, on the predicted one or more intentions and channel presence information and current channel attention information corresponding to the customer.

10. The apparatus of claim 9, wherein the apparatus is further caused to:
identify from the input provided by the customer, by the processor, a chat interaction request for initiating a chat interaction with an agent associated with the enterprise.

11. The apparatus of claim 9, wherein the input is provided by the customer to a virtual assistant (VA) associated with the electronic device.

12. The apparatus of claim 9, wherein the apparatus is further caused to:
predict the best next action based on an enterprise objective corresponding to at least one of increasing consumption of enterprise offerings and improving customer sales and service experience.

13. The apparatus of claim 9, wherein the apparatus is further caused to:
provide an enterprise response to the customer to provide a personalized interaction experience to the customer based on the predicted best next action.

14. The apparatus of claim 9, wherein the apparatus is further caused to:

store any of the login credentials or authentication information and the linking of said store any of the login credentials or authentication information to customer's personal identity.

15. The apparatus of claim 14, wherein the apparatus is further caused to:
use the customer identity linked to stored customer identity or authentication information, to facilitate one or more subsequent customer interactions with agents of the enterprise are facilitated on the messaging platform.

16. The apparatus of claim 9, wherein the apparatus is further caused to:
receive contextual information related to the request for interaction; and
transfer the contextual information to an agent of the enterprise for facilitating the customer interaction on one of the enterprise interaction channel and the third-party messaging platform.

17. A computer-implemented method, comprising:
receiving, by a processor, an input indicating a request for a chat interaction with an agent of an enterprise, the input provided by a customer of an enterprise using an electronic device;
in response to the received input, causing, by the processor, display of a user interface (UI) on the electronic device;
requesting via the UI the customer to authenticate the customer's personal identity for the enterprise by using login credentials corresponding to at least one third-party messaging platform;
receiving, by the processor the login credentials for authenticating the customer to the third-party messaging platform, the login credentials provided by the customer using the electronic device;
with the login credentials associated with the third-party messaging platform, authenticating, by the processor, the customer's personal identity for the enterprise;
linking, by the processor the login credentials for the third-party messaging platform between at least one of the customer or the electronic device and the enterprise to facilitate authentication of the customer's personal identity for one or more requests for chat interactions with the enterprise that are received from the customer subsequent to completion of the chat interaction;
subsequent to successful authentication of the customer's personal identity, facilitating, by the processor, the customer interaction via the electronic device with the enterprise on one of an enterprise interaction channel or the third-party messaging;

retrieving, by the processor, stored information corresponding to the customer subsequent to successful authentication of the customer's personal identity, the stored information comprising information related to one or more past interactions of the customer with the enterprise;
predicting, by the processor, one or more intentions of the customer for providing the input, the one or more intentions predicted based on the received input and the retrieved stored information;
receiving, by the processor, channel presence information for a plurality of interaction channels corresponding to the customer indicating that the customer is logged into a native mobile application and that the customer is also browsing one or more Websites;
receiving, by the processor, current channel attention information corresponding to the customer indicating an interaction channel that the customer is currently attentive to; and
predicting, by the processor, a best next action for the customer based, at least in part, on the predicted one or more intentions and the received channel presence information and current channel attention information corresponding to the customer.

18. The method of claim 17, further comprising:
providing, by the processor, an enterprise response to the customer to provide a personalized interaction experience to the customer, the enterprise response provided to the customer based on the predicted best next action.

19. The method of claim 17, further comprising:
storing, by the processor, the login credentials and the respective linking of login credentials to the at least one of the customer and the electronic device.

20. The method of claim 19, further comprising:
facilitating one or more subsequent customer interactions with agents of the enterprise on the messaging platform using at least one of the stored login credentials and the respective linking of login credentials.

21. The method of claim 17, further comprising:
receiving, by the processor, contextual information related to the request for interaction; and
transferring, by the processor, the contextual information to the agent of the enterprise for facilitating the chat interaction on one of the enterprise Website and the third-party messaging platform.

* * * * *